US006618668B1

(12) United States Patent
Laird

(10) Patent No.: US 6,618,668 B1
(45) Date of Patent: Sep. 9, 2003

(54) SYSTEM AND METHOD FOR OBTAINING VEHICLE SCHEDULE INFORMATION IN AN ADVANCE NOTIFICATION SYSTEM

(75) Inventor: David Laird, Fort Walton Beach, FL (US)

(73) Assignee: Arrivalstar, Inc., Delray Beach, FL (US)

( * ) Notice: Subject to any disclaimer, the term of this patent is extended or adjusted under 35 U.S.C. 154(b) by 0 days.

(21) Appl. No.: 09/558,508

(22) Filed: Apr. 26, 2000

(51) Int. Cl.⁷ .............................................. G08G 1/123

(52) U.S. Cl. ........................ 701/204; 701/213; 340/994

(58) Field of Search ................................. 701/200, 204, 701/207, 208, 209, 211, 213, 117; 340/988, 990, 994

(56) References Cited

U.S. PATENT DOCUMENTS

| | | | | |
|---|---|---|---|---|
| 3,845,289 A | 10/1974 | French | ..................... | 235/151.2 |
| 4,220,946 A | 9/1980 | Henriot | ........................ | 340/23 |
| 4,350,969 A | 9/1982 | Greer | .......................... | 340/23 |

(List continued on next page.)

FOREIGN PATENT DOCUMENTS

| | | |
|---|---|---|
| FR | 2559930 | 2/1984 |
| FR | 2674355 | 9/1992 |
| GB | WO 93/13510 A1 | 7/1993 |
| JP | 52066175 A | 6/1977 |
| JP | 63-288400 | 11/1988 |
| JP | 411034872 A | 2/1999 |

OTHER PUBLICATIONS

Patent Application entitled "Advanced Notification System and Method Utilizing a Distinctive Telephone Ring"; filed Dec. 9, 1996; Ser. No. 08/762,052.

Patent Application entitled "Advanced Notification System and Method Utilizing a Computer Network"; filed May 6, 1997; Ser. No. 08/852,119.

Patent Application entitled "System and Method for an Advance Notification System for Montoring and Reporting Proximity of a Vehicle"; filed Sep. 30, 1998; Ser. No. 09/163,588.

Patent Application entitled "System and Method for an Advance Notification System for Monitoring and Reporting Proximity of a Vehicle"; filed Jul. 18, 2001; Ser. No. 09/908,471.

Patent Application entitled "Package Delivery Notification System and Method"; filed Mar. 1, 2000; Ser. No. 09/516,288.

Patent Application entitled "Vehicular Route Optimization System and Method"; filed Mar. 1, 2000; Ser. No. 09/516,127.

(List continued on next page.)

Primary Examiner—Gary Chin
(74) Attorney, Agent, or Firm—Thomas, Kayden, Horstemeyer & Risley, LLP

(57) ABSTRACT

A vehicle monitoring and notification system includes a mapping application and a data manager. The mapping application receives data identifying a particular location and automatically translates this data into a set of location values. The mapping application then stores the foregoing set of location values. The data manager retrieves the stored set of location values and monitors travel of a vehicle based on location values produced by a location sensor coupled to the vehicle. The data manager compares a set of location values produced by the sensor to the stored set of location values to determine when the vehicle is within a predefined proximity of the particular location. When the data manager determines that the vehicle is within the predefined proximity of the particular location, the data manager causes a notification message to be transmitted to a user communications device to notify a user of an impending arrival of the vehicle at the particular location.

32 Claims, 6 Drawing Sheets

U.S. PATENT DOCUMENTS

| | | | | |
|---|---|---|---|---|
| 4,791,571 A | | 12/1988 | Takahashi et al. | 364/436 |
| 4,799,162 A | * | 1/1989 | Shinkawa et al. | 340/994 |
| 4,804,937 A | | 2/1989 | Barbiaux et al. | 340/52 F |
| 4,812,843 A | | 3/1989 | Champion, III et al. | 340/905 |
| 4,956,777 A | | 9/1990 | Cearley et al. | 364/424.02 |
| 5,014,206 A | | 5/1991 | Scribner et al. | 364/449 |
| 5,068,656 A | | 11/1991 | Sutherland | 340/989 |
| 5,113,185 A | | 5/1992 | Ichikawa | 340/995 |
| 5,121,326 A | | 6/1992 | Moroto et al. | 364/449 |
| 5,122,959 A | | 6/1992 | Nathanson et al. | 364/436 |
| 5,168,451 A | | 12/1992 | Bolger | 364/436 |
| 5,223,844 A | | 6/1993 | Mansell et al. | 342/357 |
| 5,299,132 A | | 3/1994 | Wortham | 364/460 |
| 5,351,194 A | | 9/1994 | Ross | 364/449 |
| 5,381,338 A | | 1/1995 | Wysocki et al. | 364/449 |
| 5,400,020 A | | 3/1995 | Jones et al. | 340/994 |
| 5,444,444 A | | 8/1995 | Ross | 340/994 |
| 5,461,374 A | | 10/1995 | Lewiner et al. | 340/994 |
| 5,483,454 A | | 1/1996 | Lewiner et al. | 364/443 |
| 5,493,295 A | | 2/1996 | Lewiner et al. | 340/994 |
| 5,587,715 A | | 12/1996 | Lewis | 342/357 |
| 5,602,739 A | | 2/1997 | Haagenstad et al. | 364/436 |
| 5,623,260 A | | 4/1997 | Jones | 340/994 |
| 5,648,770 A | | 7/1997 | Ross | 340/994 |
| 5,657,010 A | | 8/1997 | Jones | 340/994 |
| 5,668,543 A | | 9/1997 | Jones | 340/994 |
| 5,673,305 A | | 9/1997 | Ross | 379/58 |
| 5,719,771 A | | 2/1998 | Buck et al. | 364/443 |
| 5,724,243 A | | 3/1998 | Westerlage et al. | 364/446 |
| 5,736,940 A | | 4/1998 | Burgener | 340/994 |
| 5,739,774 A | | 4/1998 | Olandesi | 340/994 |
| 5,751,245 A | | 5/1998 | Janky et al. | 342/357 |
| 5,760,742 A | | 6/1998 | Branch et al. | 342/457 |
| 5,808,565 A | | 9/1998 | Matta et al. | 340/994 |
| RE35,920 E | | 10/1998 | Sorden et al. | 342/457 |
| 5,845,227 A | * | 12/1998 | Peterson | 701/209 |
| 5,897,604 A | * | 4/1999 | Takahashi et al. | 701/200 |
| 5,938,721 A | * | 8/1999 | Dussell et al. | 701/213 |
| 5,955,974 A | | 9/1999 | Togawa | 340/994 |
| 5,987,377 A | * | 11/1999 | Westerlage et al. | 340/994 |
| 6,006,159 A | | 12/1999 | Schmeir et al. | 701/200 |
| 6,124,810 A | | 9/2000 | Segal | 340/994 |
| 6,134,501 A | | 10/2000 | Oumi | 701/209 |
| 6,137,425 A | * | 10/2000 | Oster et al. | 340/994 |
| 6,184,802 B1 | * | 2/2001 | Lamb | 340/994 |
| 6,191,708 B1 | | 2/2001 | Davidson | 340/994 |
| 6,202,022 B1 | * | 3/2001 | Ando | 701/200 |
| 6,240,362 B1 | * | 5/2001 | Gaspard, II | 340/994 |
| 6,253,148 B1 | | 6/2001 | Decaux et al. | 701/204 |
| 6,278,936 B1 | | 8/2001 | Jones | 701/201 |
| 6,313,760 B1 | | 11/2001 | Jones | 340/994 |
| 6,317,060 B1 | | 11/2001 | Jones | 340/994 |
| 6,360,101 B1 | | 3/2002 | Irvin | 455/456 |
| 6,363,254 B1 | | 3/2002 | Jones et al. | 455/456 |
| 6,363,323 B1 | | 3/2002 | Jones | 701/213 |
| 6,374,176 B1 | | 4/2002 | Schmier et al. | 701/200 |
| 6,400,956 B1 | | 6/2002 | Richton | 455/456 |
| 6,411,891 B1 | | 6/2002 | Jones | 701/201 |
| 6,415,207 B1 | | 7/2002 | Jones | 701/1 |
| 6,486,801 B1 | | 11/2002 | Jones | 340/994 |
| 2002/0016171 A1 | | 2/2002 | Doganata et al. | 455/456 |

OTHER PUBLICATIONS

Patent Application entitled "System and Method for Efficiently Notifying Users of Impending Arrivals of Vehicles"; filed Mar. 1, 2000; Ser. No. 09/516,876.

Patent Application entitled "Advance Notification System and Method Utilizing Vehicle Signaling"; filed Nov. 6, 2001; Ser. No. 09/992,817.

* cited by examiner

| | TIME | Contact Information | Vechicle ID |
|---|---|---|---|
| Entry 1 | 6:30 | 1235670987 | 1112 |
| Entry 2 | 9:15 | 1235290945 | 2034 |
| Entry 3 | 12:45 | 1235467867 | 1390 |
| Entry 4 | 15:30 | 1234342313 | 0999 |

SYSTEM AND METHOD FOR OBTAINING VEHICLE SCHEDULE INFORMATION IN AN ADVANCE NOTIFICATION SYSTEM

CROSS REFERENCE TO RELATED APPLICATIONS

This application is a continuation-in-part of the claims priority to U.S. Utility Patent Application entitled "ADVANCE NOTIFICATION SYSTEMS AND METHODS UTILIZING A COMPUTER NETWORK," filed on May 6, 1997 by M. K. Jones and assigned Ser. No. 08/852,119, and which is incorporated herein in its entirety, where U.S. Utility Patent Application 08/852,119 is a continuation of and claims priority to the following U.S. applications:

(a) provisional application entitled, "ADVANCED NOTIFICATION SYSTEM AND METHOD UTILIZING A COMPUTER NETWORK," filed Mar. 7, 1997 by M. K. Jones and assigned Ser. No. 60/039,925;

(b) nonprovisional application entitled, "ADVANCED NOTIFICATION SYSTEM AND METHOD UTILIZING PASSENGER-DEFINABLE NOTIFICATION TIME PERIOD," filed May 2, 1995 by M. K. Jones and assigned Ser. No. 08/434,049, now U.S. Pat. No. 5,623,260 that issued on Apr. 22, 1997;

(c) nonprovisional application entitled, "ADVANCED NOTIFICATION SYSTEM AND METHOD UTILIZING VEHICLE PROGRESS REPORT GENERATOR," filed May 2, 1995 by M. K. Jones and assigned Ser. No. 08/432,898, now U.S. Pat. No. 5,657,010 that issued on Aug. 12, 1997; and (d) nonprovisional application entitled, "ADVANCE NOTIFICATION SYSTEM AND METHOD UTILIZING PASSENGER CALLING REPORT GENERATOR," filed May 2, 1995 by M. K. Jones and assigned Ser. No. 08/432,666, now U.S. Pat. No. 5,668,543 that issued on Sep. 16, 1997;

where documents (b), (c), and (d) are each a continuation-in-part of the application entitled "ADVANCED NOTIFICATION SYSTEM AND METHOD UTILIZING A DISTINCTIVE TELEPHONE RING," filed Mar. 20, 1995 by M. K. Jones and assigned Ser. No. 08/407,319, now abandoned, which in turn is a continuation-in-part of an application entitled "ADVANCE NOTIFICATION SYSTEM AND METHOD" filed May 18, 1993 by M. K. Jones et al. and assigned Ser. No. 08/063,533, now U.S. Pat. No. 5,400,020 that issued on Mar. 21, 1995.

BACKGROUND OF THE INVENTION

1. Field of the Invention

The present invention generally relates to vehicle monitoring and messaging systems and, in particular, to a vehicle monitoring system and method capable of efficiently obtaining and maintaining vehicle schedule information that is used to monitor travel of a vehicle.

2. Related Art

U.S. Pat. No. 5,400,020, entitled, "ADVANCE NOTIFICATION SYSTEM AND METHOD," which is incorporated herein by reference, describes an advance notification system that provides users with notice of an impending arrival of a vehicle at a particular location. In this regard, a location sensor, such as a global positioning system (GPS) sensor, is attached to a vehicle associated with the system. Based on the output of the location sensor, the location of the vehicle is monitored by a control unit or control units located on the vehicle and/or at a stationary base station remotely located from the vehicle. When it is determined that the vehicle is within a predefined proximity (i.e., a particular time or distance) from a particular location of interest to a user (e.g., a vehicle stop), a notification message is transmitted to the user to notify the user of the impending arrival of the vehicle. The user may then prepare for the impending arrival of the vehicle in response to the notification message.

There are a variety of passenger and/or package transportation services pickup and/or delivery applications that may utilize the advance notification system. However, as the number of users and/or vehicle stops associated with the services being offered increases, the complexity of the advance notification can increase dramatically. For example, a regional package transportation service that services a major metropolitan city may deliver tens of thousands of packages per day. Likewise, passenger transportation services servicing a metropolitan area or a county-wide school system may transport many thousands of passengers per day as well.

Therefore, the process of producing the vehicle schedules (i.e., the routes and times that the vehicle should travel) required to transport the packages or passengers can be quite burdensome and complicated. Furthermore, when an advance notification system is employed, schedules should indicate not only the route for each vehicle but should also indicate when notification messages should be transmitted for each transported package or passenger. The information indicating when the users are to be notified or where a delivery or pick-up is to occur may be provided by each individual user. Needless to say, obtaining and maintaining the necessary information to provide users with advance notification of arrivals of vehicles can be quite burdensome and complicated in many applications.

Further adding to the complexity of the advance notification system, the data necessary for producing the appropriate vehicle schedules is not always readily available. For example, when the location sensor used to monitor a vehicle is a GPS sensor, the location values produced by sensor are coordinate values (e.g., longitude and latitude values). These coordinate values should be compared to the location values defining the vehicle's schedule to determine when notification messages should be transmitted. Therefore, the location values produced by the sensor should be compatible with the location values of the vehicle schedule to enable accurate comparisons. However, the data input into the system that is used to define the vehicle schedule is not necessarily compatible with the location values produced by the sensor. For example, when a user would like to be picked-up or to receive delivery at a particular location, the user often knows the address of the location but does not know the coordinate values of the location. Therefore, the user may only provide address information, which is incompatible with the location values produced by the sensor, and additional steps must be taken to enable accurate comparisons.

Thus, a heretofore unaddressed need exists in the industry for a vehicle monitoring system and method for efficiently obtaining and maintaining vehicle schedule information that may be used to monitor the travel of vehicles.

SUMMARY OF THE INVENTION

The present invention overcomes many inadequacies and deficiencies of the prior art, as discussed hereinbefore. In general, the present invention provides a vehicle monitoring system and method for obtaining and maintaining vehicle schedule information and for monitoring vehicles based on the vehicle schedule information so that a notification message may be transmitted to notify at least one user when a particular vehicle is within a predefined proximity of a particular location.

In a broad sense, the system of the present invention includes a mapping application and a data manager. The mapping application receives data identifying a particular location and automatically translates this data into a set of location values. The mapping application then stores the foregoing set of location values. The data manager retrieves the stored set of location values and monitors travel of a vehicle based on location values produced by a location sensor coupled to the vehicle. The data manager compares a set of location values produced by the sensor to the stored set of location values to determine when the vehicle is within a predefined proximity of the particular location. When the data manager determines that the vehicle is within the predefined proximity of the particular location, the data manager causes a notification message to be transmitted to a user communications device to notify a user of an impending arrival of the vehicle at the particular location.

In accordance with another feature of the present invention, the mapping application produces a map displaying symbols representing various locations. The user selects from the map the particular location that is to be used to determine when the notification message is to be generated.

In accordance with another feature of the present invention, the mapping application receives data identifying a plurality of locations where items are to be delivered or picked-up by one of the vehicles being monitored by the system or method of the present invention. Based on this data, the mapping application automatically defines a set of routes that are to be driven by the foregoing vehicles. The mapping application then outputs the routes that are to be driven by each of the vehicles and, if desired, which items are to be transported by each vehicle.

The present invention can also be viewed as providing a method for tracking vehicles.

The method can be broadly conceptualized by the following steps: receiving data identifying a particular location from said user interface device; automatically translating the data received in the receiving step into a set of location values; storing the set of location values; monitoring travel of a vehicle based on location values produced by a location sensor coupled to the vehicle; comparing the set of the location values produced by the location sensor to the set of location values stored in the storing step; determining when the vehicle is within a predefined proximity of the particular location based on the comparing step; causing a notification message to be transmitted to a user communications device in response to a determination in the determining step that the vehicle is within the predefined proximity of the particular location; and notifying a user of an impending arrival of the vehicle at the location via the notification message.

Other features and advantages of the present invention will become apparent to one skilled in the art upon examination of the following detailed description, when read in conjunction with the accompanying drawings. It is intended that all such features and advantages be included herein within the teachings of the present invention, as set forth herein and as sought to be protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
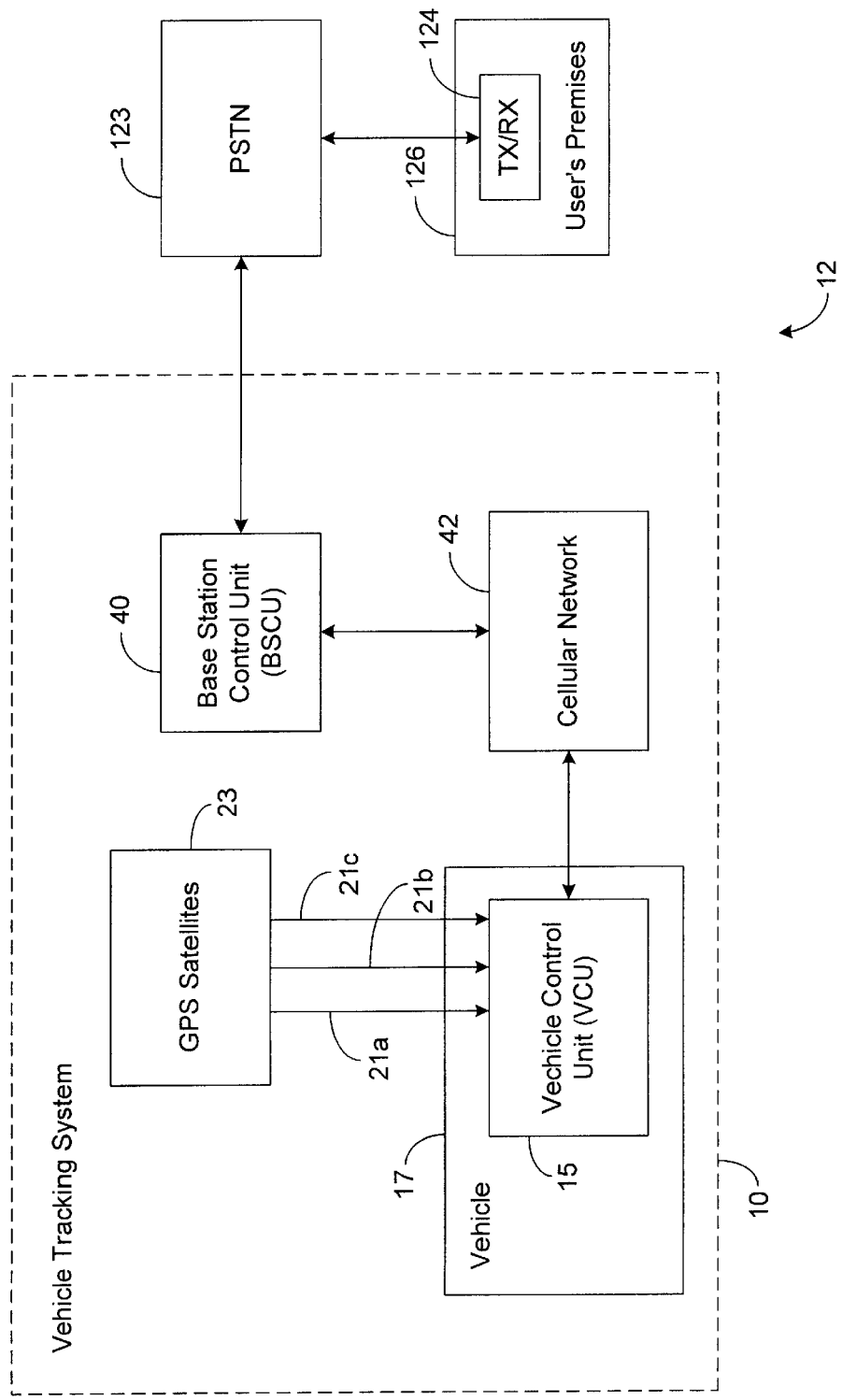
FIG. 1 is a block diagram illustrating a vehicle tracking system employed within the context of an advance notification system in accordance with the preferred embodiment of the present invention.

FIG. 1 depicts an automated vehicle tracking system 10 illustrating the principles of the present invention. As shown by FIG. 1, the vehicle tracking system 10 is preferably employed within the context of an automated advance notification system 12 that automatically provides advance notice of impending arrivals of vehicles at destinations or other locations.

As depicted in FIG. 1, a vehicle control unit (VCU) 15 is disposed on a mobile vehicle 17, which is capable of transporting the VCU 15 over various distances. U.S. Patent application entitled, "System and Method for an Advance Notification System for Monitoring and Reporting Proximity of a Vehicle," assigned Ser. No. 09/163,958, and filed on Sep. 30, 1998, which is incorporated herein by reference, describes an exemplary VCU 15 that may be used to implement the principles of the present invention.

In the preferred embodiment, the vehicle 17 is a delivery vehicle for delivering items to a destination or for picking up items at a destination. Note that items can include many various types of packages or goods to be delivered or picked up. Furthermore, items can also include persons to be picked up or delivered, such as when a bus picks up and/or delivers passengers at different bus stops. Preferably, the vehicle 17 travels along a predetermined route in making its deliveries, and the vehicle 17 may make numerous stops along its route in order to deliver or pick up different items at different locations.

In the context of this document, a "vehicle" is any structure capable of moving across or through the Earth's surface and/or atmosphere. Examples of a "vehicle" include, but are not limited to, an automobile, an aircraft, a train, or a boat. A "vehicle" may also be a person that carries the VCU 15 while walking or running.

Vehicle Control Unit

Figure 2:
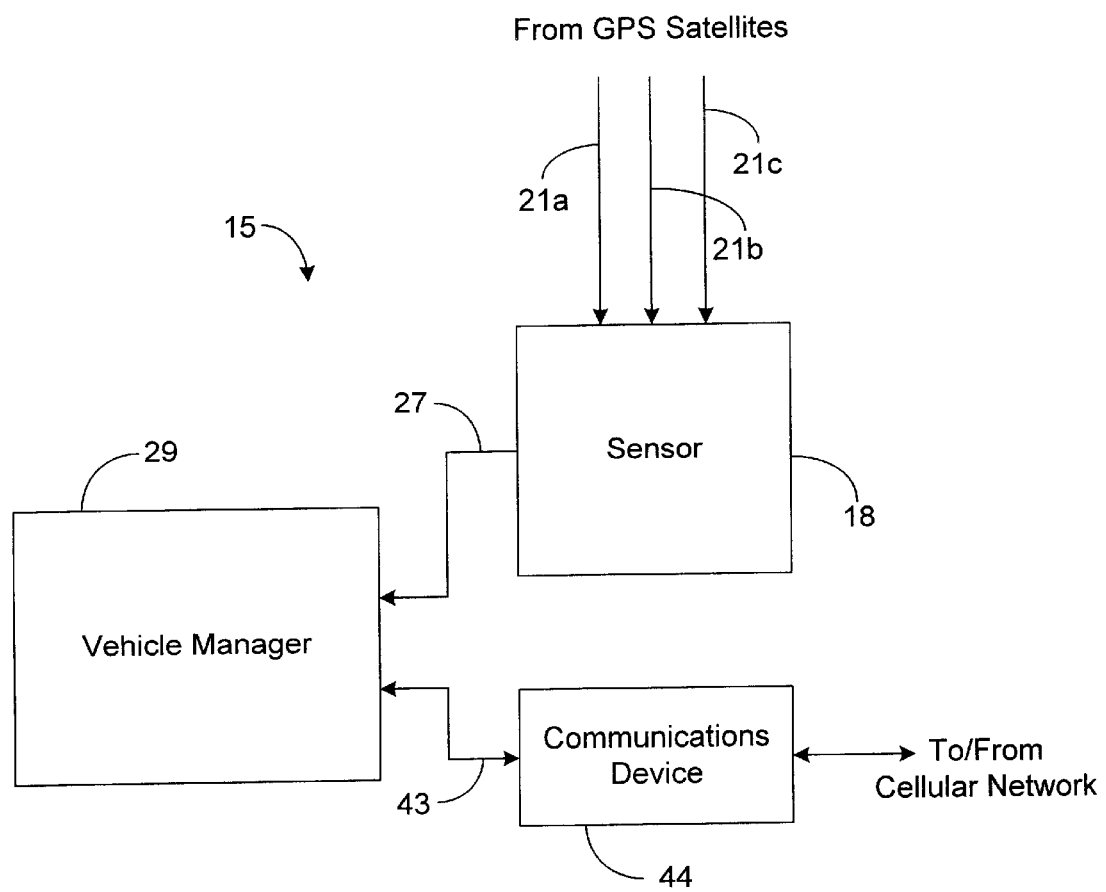
FIG. 2 is a block diagram illustrating a more detailed view of a vehicle control unit depicted in FIG. 1.

A more detailed view of the VCU 15 is depicted in FIG. 2. A sensor 18 within VCU 15 is configured to determine the location of the sensor 18 relative to a predetermined reference point. In the preferred embodiment, sensor 18 is a global positioning system (GPS) sensor, although other types of positioning systems and/or sensors can be utilized. For example, other types of sensors 18 that may be used to implement the principles of the present invention include, but are not limited to, an odometer or sensors associated with Glonass, Loran, Shoran, Decca, or Tacan. The GPS sensor 18 of the preferred embodiment is configured to receive signals 21a–21c from a plurality of GPS satellites 23, and as known in the art, sensor 18 is designed to analyze signals 21a–21c to determine the sensor's location or coordinate values relative to a predetermined reference point.

For example, in the preferred embodiment where sensor 18 is a GPS sensor, the sensor 18 determines the sensor's location values relative to the Earth's zero degree latitude and zero degree longitude reference point, which is located at the intersection of the Equator and the Prime Meridian. U.S. Pat. No. 5,781,176 entitled, "GPS Receiver and Method for Processing GPS Signals" and filed on Apr. 23, 1997 by Krasner, which is incorporated herein by reference, discusses the processing of GPS signals 21a–21c received from GPS satellites 23 in order to determine the sensor's location values. Since the sensor 18 is located on or within the vehicle 17, the location values determined by the sensor 18 are assumed to match the location values of the vehicle 17 and the VCU 15.

It should be noted that the term "location value" shall be defined herein to mean any value or set of values that may be used to determine a location of a point on the Earth or within the Earth's atmosphere. This value may be a distance value, a coordinate value (i.e., grid value), polar value, vector value, or any other type of value or values known in the art for indicating locations of points.

Sensor 18 is designed to periodically transmit a signal 27 to vehicle manager 29 indicating the vehicle's current location values. Vehicle manager 29 is configured to receive signal 27 and to monitor the location of the vehicle 17 over time by processing multiple signals 27. The vehicle manager 29 can be implemented in software, hardware, or a combination thereof. In the preferred embodiment, as illustrated by way of example in FIG. 3, the vehicle manager 29 of the present invention along with its associated methodology is implemented in software and stored in computer memory 30 of a computer system 31.

Note that the vehicle manager 29 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a"computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the vehicle manager 29 may be magnetically stored and transported on a conventional portable computer diskette.

Figure 3:
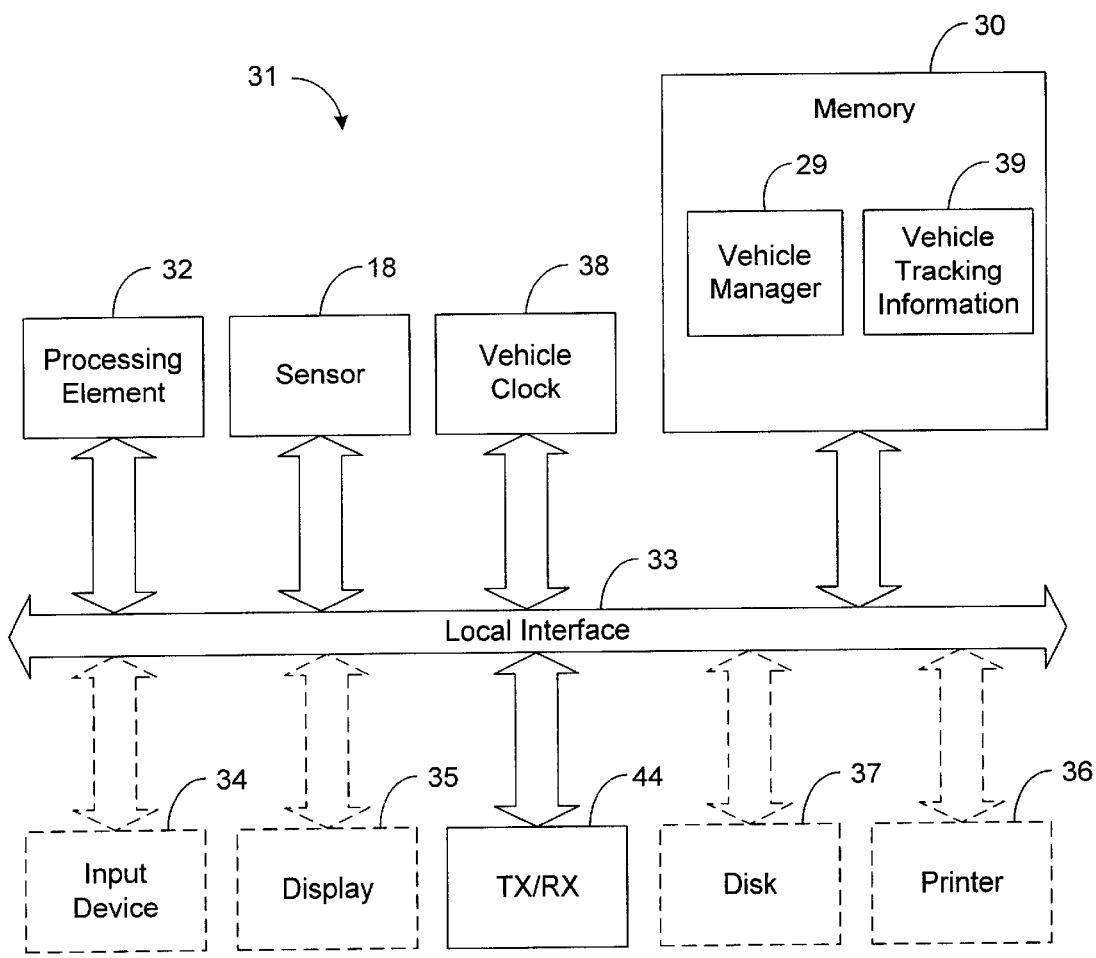
FIG. 3 is a block diagram illustrating a computer system implementing the functionality of the vehicle control unit of FIG. 2 in accordance with the preferred embodiment of the present invention.

The preferred embodiment of the computer system 31 of FIG. 3 comprises one or more conventional processing elements 32, such as a digital signal processor (DSP), that communicate to and drive the other elements within the system 31 via a local interface 33, which can include one or more buses. Furthermore, an input device 34 can be used to input data into the system 31, and screen display 35 or a printer 36 can be used to output data to the user. A disk storage mechanism 37 can be connected to the local interface 33 to transfer data to and from a nonvolatile disk (e.g., magnetic, optical, etc.). Furthermore, a vehicle clock 38 may be connected to the computer system 31 so that components of the system 31 may utilize data from the clock 38 to determine time through conventional techniques. It should be noted that input device 34, display 35, printer 36, and disk 37 are optional and are not necessarily a part of the preferred embodiment.

The vehicle manager 29 is preferably configured to maintain a predefined schedule, referred to herein as "vehicle tracking information 39," within memory 30. The predefined vehicle tracking information 39 corresponds with a route of travel for the vehicle 17. In this regard, the predefined vehicle tracking information 39 stored in memory 30 includes data defining locations or "checkpoints" along the vehicle's intended route of travel. Furthermore, each checkpoint is associated with a particular time value indicating when the vehicle 17 is expected to pass the associated checkpoint. Each checkpoint along with its associated time value may define an entry in the vehicle tracking information 39.

In the preferred embodiment, the time value associated with a checkpoint corresponds to a time of day that the vehicle 17 is expected to pass the checkpoint. For example, the time value associated with a checkpoint may define the hour and minute that the vehicle 17 is expected to pass the checkpoint. Consequently, when the vehicle 17 reaches the location defined by the checkpoint, the time of day, as defined by vehicle clock 38, can be compared with the time value in the vehicle tracking information 39 associated with the checkpoint to determine whether the vehicle 17 is early, late, or on time. It should be noted that other data and other methodologies may be employed to determine whether or not the vehicle 17 is on schedule, without departing from the principles of the present invention.

As the vehicle 17 travels along its route, the vehicle manager 29 determines when the vehicle 17 passes a checkpoint by comparing the data received from sensor 18 with the checkpoint data stored in vehicle schedule 39. When the vehicle manager 29 determines that a checkpoint has been passed, the vehicle manager 29 is configured to determine a time value indicating the time of day by analyzing vehicle clock 38, and the vehicle manager 29 is configured to compare this time value with the time value in the vehicle tracking information 39 associated with the checkpoint.

The vehicle 17 is considered to be off schedule if the value for the time of day from clock 38 differs from the time value in the vehicle tracking information 39 by a predetermined amount. Otherwise the vehicle 17 is considered to be on schedule. For example, assume that the vehicle 17 is to be considered off schedule if the vehicle 17 is early or late by more than two minutes and assume that the vehicle 17 is scheduled to pass a checkpoint at 6:30 a.m. If the vehicle 17 passes the checkpoint between 6:28 a.m. and 6:32 a.m., the vehicle 17 is on schedule. If the vehicle 17 passes the checkpoint before 6:28 a.m., the vehicle is off schedule and is early. If the vehicle 17 passes the checkpoint after 6:32 a.m., the vehicle 17 is off schedule and is late.

If the vehicle manager 29 determines that the vehicle 17 is off schedule, the vehicle manager 29 is configured to transmit a status message to a base station control unit (BSCU) 40 (FIG. 1) indicating how much the vehicle is off schedule, and the vehicle manager 29 is also configured to update the entries in the tracking information 39. For example, assume that the vehicle 17 passes the aforementioned checkpoint at 6:25 a.m. In this example, the vehicle 17 is off schedule and five minutes early. Therefore, the vehicle manager 29 transmits a status message to BSCU 40 via cellular network 42 indicating that the vehicle 17 is five minutes early and decreases the expected times stored in the tracking information 39 by five minutes. As a result, the schedule 39 is adjusted to account for the vehicle's earliness, and the vehicle 17 will not be deemed off schedule when the vehicle 17 passes the other checkpoints, provided that the rate of travel of the vehicle 17 continues as expected for the remainder of the route. Similarly, if the vehicle 17 passes the aforementioned checkpoint at 6:35 a.m., then the vehicle manager 29 is configured to transmit a status message indicating that the vehicle 17 is five minutes late and is configured to increase the times stored in the tracking information 39 by five minutes.

It should be noted that updating the vehicle tracking information 39 is not necessary in implementing the present invention. However, if the vehicle 17 is early or late at one checkpoint, the vehicle 17 will likely be respectively early or late at other checkpoints, causing the vehicle manager 29 to make an off schedule determination and to transmit a status message at each of the remaining checkpoints in the route. By updating the times in the vehicle tracking information 39, the number of status messages transmitted to the BSCU 40 may be reduced in monitoring the travel of the vehicle 17.

It should be further noted that the status message transmitted by VCU 15 may be communicated via any suitable technique and that utilization of the cellular network 42 is not necessary. In this regard, other types of networks may be used to communicate the status message, or the status message may be communicated directly to the base station control unit 40 without the use of any type of communication network. For example, the status message may be communicated via short wave radio.

Base Station Control Unit

Figure 4:
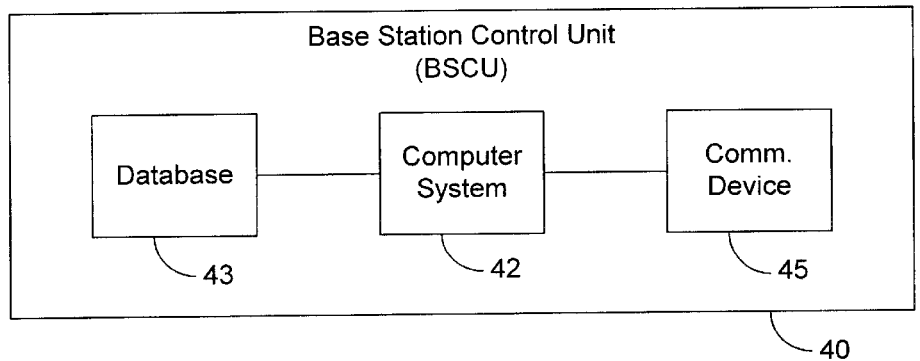
FIG. 4 is a block diagram illustrating an implementation of a base station control unit depicted in FIG. 1.

Referring to FIG. 4, the base station control unit (BSCU) 40 preferably comprises a computer system 42 interfaced with a database 43 and a communications device 45. The communications device 45 may be a computer system separate to system 42 or may be a component (e.g., peripheral device) of the computer system 42. A suitable communications device 45 is described in U.S. Patent Application entitled, "Base Station System and Method for Monitoring Travel of Mobile Vehicles and Communicating Notification Messages," (atty. dockect no. 51404-1070), which is incorporated herein by reference. Furthermore, database 43 may be separate from system 24, as shown by FIG. 4, or may be employed by memory within system 42.

Figure 5:
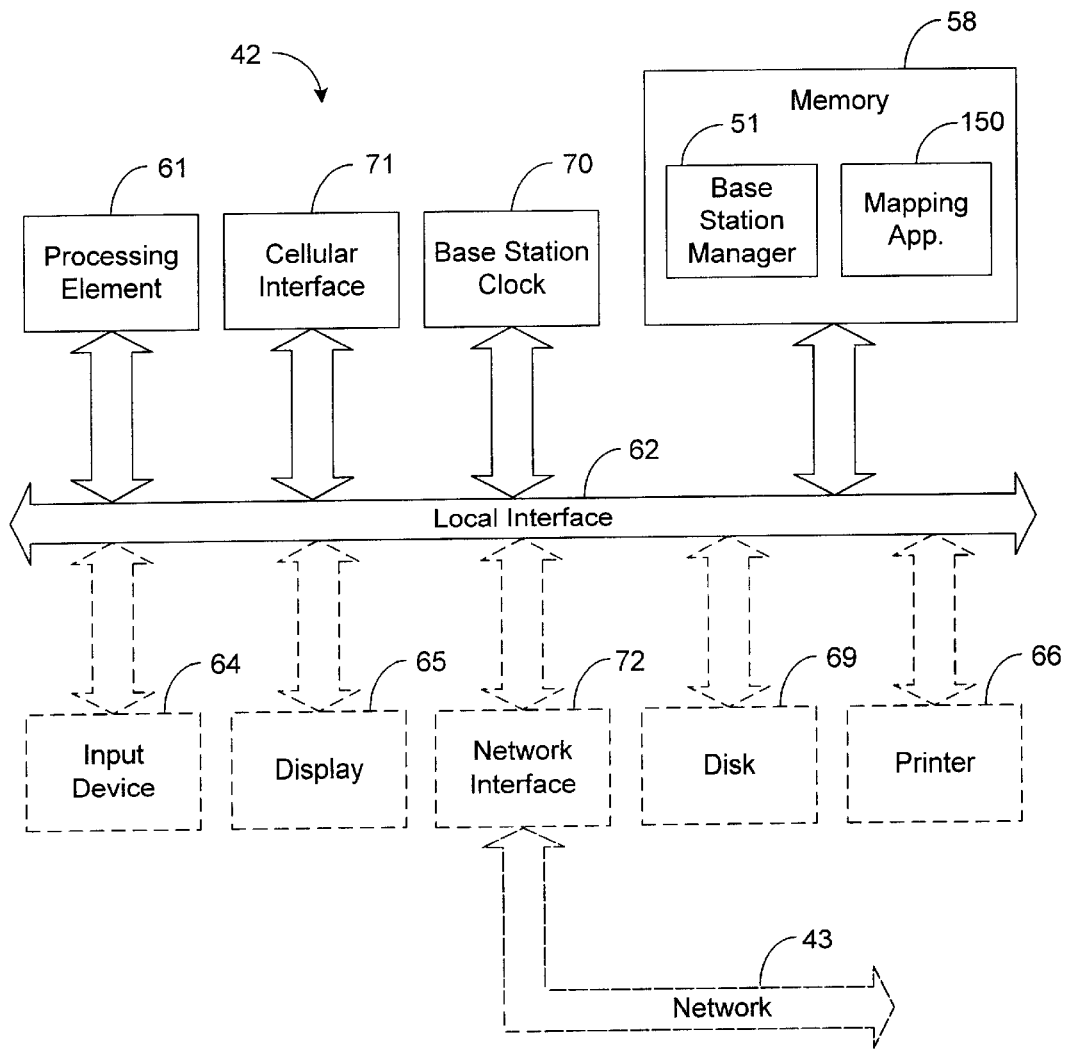
FIG. 5 is a block diagram illustrating a computer system depicted in FIG. 4.

Referring to FIG. 5, the computer system 42 includes a base station manager 51. The base station manager 51 can be implemented in software, hardware, or a combination thereof In the preferred embodiment, as illustrated by way of example in FIG. 5, the base station manager 51 of the present invention along with its associated methodology is implemented in software and stored in memory 58.

Further shown by FIG. 5, the computer system 42 may include one or more processing elements 61, such as a DSP, that communicate to and drive the other elements within the system 42 via a local interface 62, which may include one or more buses. Furthermore, an input device 64, for example, a keyboard or a mouse, can be used to input data from a user of the system 42, and screen display 65 or a printer 66 can be used to output data to the user. A disk storage mechanism 69 can be connected to the local interface 62 to transfer data to and from a nonvolatile disk (e.g., magnetic, optical, etc.). Furthermore, a base station clock 70 may be connected to the computer system 42 so that components of the system 42 may utilize data from the clock 70 to determine time through conventional techniques. The system 42 may also be connected to a cellular interface 71, or other type of suitable interface, for communicating with VCU 15. It may also be desirable for computer system 42 to include a network interface 72 that allows the system 42 to exchange data with a network 73. It should be noted that input device 64, display 65, printer 66, disk 69, network interface 72, and network 73 are optional and are not necessarily a part of the preferred embodiment.

The database 43 shown by FIG. 4 preferably stores data defining the route schedule of one or more vehicles 17. For example, the database 43 may include entries that are correlated with a vehicle 17 of the system 10 (FIG. 1), wherein each entry includes sufficient data to define a checkpoint that may be used to monitor the travel of the vehicle 17. The checkpoints defined in the database 43 for a particular vehicle 17 are preferably the same checkpoints defined in vehicle tracking information 39 (FIG. 3) for the particular vehicle 17. Furthermore, the entry may also include data to indicate the time of day that the vehicle 17 is expected to reach the checkpoint defined by the entry. Therefore, the database 43 includes sufficient data to define the checkpoints used to monitor the vehicles 17 associated with the system 10 and the times that the vehicles 17 should respectively pass the checkpoints.

The database 43 of the preferred embodiment also includes data indicating when different users are to be notified of an impending arrival of at least one of the vehicles 17 associated with the system 10. For example, the database 43 may include data indicating that a user should be notified a certain amount of time before or after a particular vehicle 17 passes a particular checkpoint. Therefore, at any time, the database 43 can be queried to determine which checkpoints are to be passed by a particular vehicle 17 and when the particular vehicle 17 is expected to pass each of the checkpoints. The database 43 also can be queried to determine when users are to be notified of an impending arrival of a particular vehicle. To facilitate querying of the database 43, the entries of the database 43 may be keyed by vehicle numbers used to identify the vehicles associated with the system 10.

To illustrate the configuration and use of the database 43, assume that a user would like to be notified when a particular vehicle 17 is two minutes from a particular location, such as the user's house or a scheduled vehicle stop. Assume further that the vehicle 17 is scheduled to pass a checkpoint every five minutes after starting its route and that the particular location is expected to be reached seventeen minutes after the vehicle 17 starts its route. In this scenario, the database 43 should include data that defines each of the checkpoints along the vehicle's route and that indicates the time that the vehicle 17 is expected to pass each of the checkpoints. The database 43 should also indicate that the individual is to be notified when the vehicle 17 passes the third checkpoint, since the vehicle 17 is expected to pass the third checkpoint fifteen minutes into the route (i.e., two minutes before the vehicle 17 is expected to reach the particular location).

In the preferred embodiment, the database 43 also includes sufficient information to enable the individual to be automatically notified once a determination is made that the user should be notified. For example, the database 43 may include the individual's telephone number, pager number, e-mail address, or other type of contact information, depending on the methodology used to notify the individual.

Figures 6, 7:
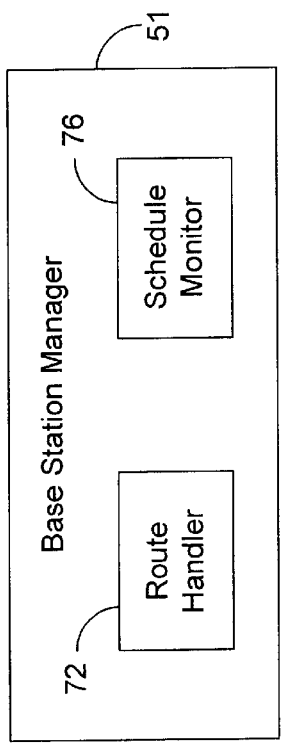
FIG. 6 is a block diagram illustrating a more detailed view of a base station manager depicted in FIG. 5.
FIG. 7 is a schematic illustrating an exemplary list of notification events generated by a route handler depicted in FIG. 6.

As shown by FIG. 6, the base station manager 51 preferably includes a route handler 72 and a schedule monitor 76. The schedule monitor 76 will be discussed in further detail hereinafter. The route handler 72 is configured to query the database 43 to build a list of notification events that are expected to occur during a specified time period. A "notification event" is the generation of a notification message to be transmitted to a user to notify the user of an impending arrival of a vehicle 17 associated with the system 10. For example, the route handler 72 may query the database 43 at the beginning of a day to determine each notification event that should occur during the course of the day, and the route handler 72 then builds a list of these events. The list should not only indicate what notification events are to occur but also should indicate at what time each notification event is expected to occur. The list may also include contact information (e.g., telephone numbers, pager numbers, e-mail addresses etc.) to facilitate the process of contacting the users associated with the notification events in the list.

FIG. 7 shows an exemplary list 81 that may be produced by the route handler 72. The list 81 depicts four entries, although any number of entries may be included in the list 81. Each entry of the list 81 is associated with a respective notification event and indicates: (1) the time at which the respective notification event is expected to occur, (2) the contact information (e.g., telephone number, pager number, e-mail address etc.) associated with the particular user, and (3) a vehicle number identifying the particular vehicle 17 associated with the notification event. For example, assume that "entry 1" is associated with a notification event for a user that would like to be notified when a particular vehicle (vehicle number "1112") is five minutes from a particular location. Based on the information stored in database 43, assume that the route handler 72 determines that the notification event should occur at 6:30 a.m. (five minutes before the particular vehicle 17 is scheduled to arrive at the particular location). As a result, "entry 1" of the list 81 indicates that the notification event associated with the entry is to occur at 6:30 a.m. "Entry 1" also provides the user's contact information and the vehicle number (1"112") of the vehicle 17 that is to arrive at the particular location. Each of the other entries can be similarly configured based on the information associated with the notification events indicated by the other entries. Once the route handler 72 has defined the list 81, the route handler 72 transmits the list 81 to schedule monitor 76.

When the BSCU 40 receives a status message from one of the VCUs 15 indicating that one of the vehicles 17 is early or late, the route handler 72 transmits an update request based on the received status message. In response to the update request, the schedule monitor 76 is designed to update the list 81, if the list 81 includes an entry associated with a notification event pertaining to the one vehicle 17.

For example, assume that the route handler 72 receives a status message indicating that the vehicle 17 associated with "entry 1" (i.e., vehicle number "1112") is seven minutes late. In response, the route handler 72 transmits an update request to schedule monitor 76. The update request preferably includes information indicating which vehicle 17 is off schedule and how much the vehicle 17 is off schedule. Based on this update request, the schedule monitor 76 determines that the vehicle 17 associated with the update request (i.e., vehicle number "1112") is seven minutes late. The schedule monitor 76 is designed to traverse the list 81 to identify each entry associated with the vehicle number "1112" and is configured to increase the time values stored in the identified entries by seven minutes to account for the tardiness of vehicle number "1112." Therefore, in the list 81 depicted by FIG. 7, the schedule monitor 76 changes the time value in "entry 1" from "6:30" to "6:37." As a result, the notification event associated with "entry 1" should not occur until 6:37 a.m.

Upon receiving a status message, the route handler 72 is also designed to update the database 43. Therefore, in the example described hereinbefore, the route handler 72 is designed to input data into the database 43 indicating that vehicle number "1112" is seven minutes late. As a result, the database 43 can be consulted at any time to determine not only the scheduled route of any vehicle 17 but also to determine the status of the vehicle 17 as the vehicle 17 is traveling its route. In this regard, if the database 43 does not indicate that a particular vehicle 17 is early or late, then it can be assumed that the vehicle 17 should arrive at its future checkpoints on schedule. However, if the database 43 indicates that the vehicle 17 is early or late, then it can be assumed that the vehicle 17 will arrive at its future checkpoints off schedule by the amount indicated by the database 43.

The schedule monitor 76 is configured to periodically scan the list 81 to determine if a notification event should occur (i.e., if a notification message should be transmitted to a user). In this regard, when the time of the day, as determined from base station clock 70, corresponds to (e.g., matches) the time indicated by one of the entries in the list 81, the schedule monitor 76 determines that the notification event associated with the corresponding entry should occur. Therefore, to initiate the occurrence of the notification event, the schedule monitor 76 is designed to transmit a notification request to the communications device 45 (FIG. 4), which transmits a notification message in response to the notification request, as will be described in more detail hereinbelow.

Figure 8:
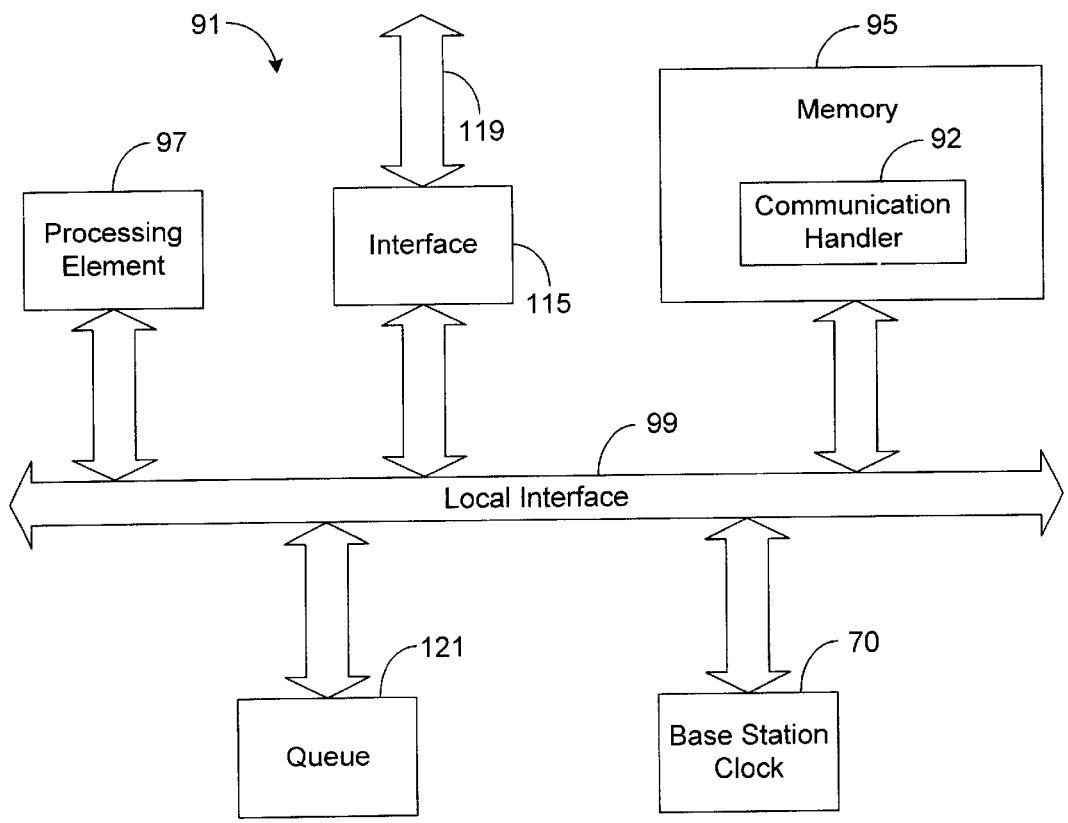
FIG. 8 is a block diagram illustrating a computer system implementing the functionality of the communications device depicted in FIG. 4.

Referring to FIG. 8, a computer system 91 may be employed to implement the communications device 45. The system 91 may include a communication handler 92 to control the operation of the system 91. The communication handler 92 may be implemented in software, hardware, or a combination thereof In the preferred embodiment, as depicted by FIG. 8, the communication handler 92 is implemented in software and stored in memory 95.

Further shown by FIG. 8, the computer system 92 may include one or more processing elements 97, such as a DSP, that communicate to and drive the other elements within the system 92 via a local interface 99, which may include one or more buses. Furthermore, the base station clock 70 may be connected to the computer system 91 so that components of the system 91 may utilize data from the clock 70 to determine time through conventional techniques. The computer system 91 of the preferred embodiment also includes an interface 115, such as a telephone interface, for example, coupled to a plurality of communication connections 119 that enables the communication handler 92 to transmit the notification messages across the connections 119. As an example, the interface 115 may be coupled to a T1 trunk or a plurality of T1 trunks that, as known in the art, are capable of placing up to twenty-four telephone calls each. Various devices may be employed to implement the interface 115 depending on the type of communication used to transmit the notification messages. For example, the interface 115 may be a telephone interface, a cellular interface, a modem, or other type of device or devices for communicating notification messages.

Figure 9:
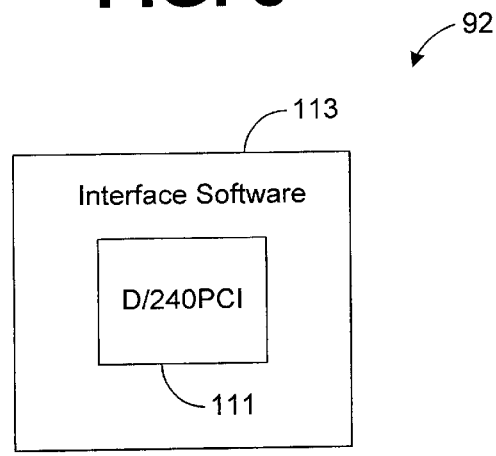
FIG. 9 is a block diagram illustrating a more detailed view of a communication handler depicted in FIG. 8.

The communication handler 92 is preferably capable of processing multiple notification requests and of simultaneously communicating multiple notification messages to users to warn the users of impending arrivals of vehicles 17. For example, in one embodiment, the communication handler 92 is implemented by a D/240PCI card 111 manufactured by Dialogic Corp., as shown by FIG. 9. Other software 113 may be implemented to interface the notification messages with the Dialogic card. This other software 113 may include Visual Voice software, which is a well known set of software commonly used to interface data with the Dialogic card 111. Furthermore, in other embodiments, the communication handler 92 may be configured to transmit notification messages one at a time, if desired.

As shown by FIG. 1, the notification messages may be routed to one or more users via a communication network, such as the publicly switched telephone network (PSTN) 123. In this regard, the network 123 routes each notification message transmitted by communication handler 92 to a communication device 124, such as a telephone, for example, at a premises 126 of a user that is to receive the notification message. Upon receiving the notification message from network 123, the communication device 124 communicates the notification message to the user. It should be noted that it is not necessary for notification messages to be communicated via telephone calls and that the communication device 124 may be any device capable of communicating a notification message. For example, the communication device 124 may be pager in one embodiment. In another embodiment, the communication handler 92 transmits a notification message to the device 124 via the Internet. For example, the communication handler 92 may transmit an e-mail message to the device 124, which in this example is a computer capable of reading the message and displaying the message to the user.

If the communication handler 92 cannot immediately transmit a notification message in response to a notification request, then the communication handler 92 is designed to store the notification request into a queue 121 (FIG. 8). The communication handler 92 then services the notification requests stored in the queue 121 on a first in, first out (FIFO) basis. Therefore, the communication handler 92 services the notification requests in the order in which they were received by the communication handler 92.

As stated hereinbefore, each notification request is generated in response to a determination that a user should be warned of an impending arrival of a particular vehicle 17 at a particular location. Therefore, each notification request preferably includes contact information to enable the communication handler 92 to send a notification message to the particular user associated with the notification request or includes other information to enable the communication handler 92 to retrieve such contact information from the database 43. As a result, the communication handler 92 is configured to utilize contact information included in the notification request or stored in the database 43 to automatically transmit a notification request to the user associated with the notification request.

It should be noted that the list 81 is not a necessary feature of the present invention. In this regard, the database 43 can be repeatedly searched to determine when to generate notification requests (i.e., where a notification event should occur). However, repeatedly searching the database 43 could result in the unnecessary processing of a vast amount of data, depending on the amount of data and entries stored in database 43. Utilization of the list 81 enables a much smaller amount of data to be searched in identifying whether notification requests should be generated during a particular time interval.

Furthermore, it is possible for the functionality of the VCU 15 and the BSCU 40 to be divided differently. In this regard, it is possible for some of the functionality performed by the BSCU 40 to be performed by the VCU 15 instead and for some of the functionality of the VCU 15 to be performed by the BSCU 40 instead. For example, it is possible to periodically transmit the location values from the sensor 18 to the BSCU 40. The BSCU 40 may then determine whether the vehicle 17 is on or off schedule based on these location values rather than the status messages transmitted by the VCU 15 in the preferred embodiment. Furthermore, it is possible for the BSCU 40 to be eliminated by having the VCU transmit notification messages directly to the users, similar to the techniques described in U.S. Pat. No. 5,444,444, which is incorporated herein by reference. It is further possible to utilize various other techniques for tracking vehicles and/or notifying users of impending arrivals, such as the techniques described in U.S. Pat. No. 5,400,020.

However, in any embodiment, at least one vehicle schedule, such as the schedule defined by vehicle tracking information 39, should be provided that includes the location values that should be compared with the values produced by the sensor 18 in determining when notification messages should be transmitted to users. These location values in the vehicle schedule may be the values indicating the vehicle stops that the vehicle 17 is expected to make and/or may be the values indicating checkpoints along the vehicle's route. Alternatively, the location values may indicate other reference locations in other embodiments.

As described in the Background section, obtaining and maintaining the foregoing location values for a vehicle schedule may be difficult and burdensome, especially when the advance notification system 12 is utilized to service a large number of vehicles 17 and/or users.

Obtaining Vehicle Schedule Information

There are various methodologies that may be employed to obtain the data defining the vehicle schedule that is used to monitor the travel of a vehicle. U.S. pat. application having Ser. No. 09/395,501 and entitled "BASE STATION APPARATUS AND METHOD FOR MONITORING TRAVEL OF A MOBILE VEHICLE," which is incorporated herein by reference, describes a process of obtaining the vehicle schedule information during an initial traversal of the route. In this regard, the vehicle 17 drives the route and the location values from the sensor 18 are stored in the VCU 15 and/or the BSCU 40 when the vehicle 17 is at each vehicle stop point and/or other checkpoint that is to be used to monitor the vehicle 17. Therefore, upon completing the route, the VCU 15 and/or the BSCU 40 should contain sufficient data for monitoring the vehicle 17 the next time the vehicle 17 drives the same route.

In another embodiment, an operator may enter into the system 10 the data that is to be used to monitor the vehicle 17. For example, the operator may obtain the coordinate values of each checkpoint that is to be used to monitor the vehicle and may enter these values into the BSCU 40 via input device 64.

However, entering the coordinate values, or other types of location values, into the system 10 can be tedious and burdensome. Furthermore, in applications where the route frequently changes, the foregoing methodologies may be impractical since the coordinate values for each new route would need to be entered into the system 12. Therefore, a mapping application 150 (FIG. 5) is preferably used to facilitate the process of entering the route data into the system 10. The mapping application 150 may be implemented in hardware, software, or a combination thereof. As shown by FIG. 5, the mapping application 150 may be implemented in software and stored within memory 58 of the BSCU 40 or other computer-readable medium.

The mapping application 150 may be configured similar to conventional mapping software programs that receive an address and produce a display of a map showing directions to the address. Most conventional mapping software programs convert the input data (e.g., the input address) into geographical coordinate values before further processing the input data. The mapping application 150 of the present invention similarly converts input data into coordinate values, which can then be automatically stored in an entry of the database 43 or the vehicle tracking information 39. Therefore, an operator can input the addresses or other location information that define the vehicle stop points and/or other checkpoints of the vehicle's route, and the mapping application 150 automatically converts this information into coordinate values, which can then be provided to and used by the system 10 to monitor the travel of the vehicle 17.

For example, a user may enter data that identifies a location where a delivery or a pickup is to take place. This data is translated into a set of coordinate values by the mapping application, and these coordinate values are then used to define at least one checkpoint and/or to indicate when at least one notification message should be transmitted. For example, based on the foregoing coordinate values, a checkpoint and/or other data may be defined such that a notification message is transmitted when a particular vehicle 17 reaches the checkpoint.

Delivery services have conventionally stored in a database, such as database 43, the address or other location information of where items are to be delivered and/or picked up. The base station manager 51, or some other control mechanism, can be configured to transmit the stored addresses to mapping application 150, which automatically converts or translates the addresses into coordinate values and provides the coordinate values to the base station manager 51. These coordinate values can then be used by the base station manager 51 to define the vehicle's checkpoints that are used to monitor the vehicle 17 and/or to indicate when a notification message should be transmitted, as described above. Therefore, the current computer systems utilized by many delivery services for tracking items can be easily modified to implement the vehicle tracking system 10 of the present invention.

Furthermore, the mapping application 150 may be configured to display a map having symbols representing various locations. The map may be displayed locally at the premises of the BSCU 40 via display 65 or may be displayed remotely by transmitting mapping data to a remote device, such as a computer at user's premises 126 via the Internet or other data communications network. A user may then select one of the displayed locations by utilizing a mouse to click on the symbol representing the location or by identifying the location via other suitable techniques (e.g., entering inputs via a keyboard). The mapping application 150 may be configured to provide the coordinate values of the selected location to the base station manager 51. These coordinate values may then be transmitted to database 43 by the base station manager 51 and used to define at least one checkpoint for a vehicle 17 and/or to indicate when at least one notification message should be transmitted, as described above. Therefore, the mapping application 150 may enable users to efficiently and easily provide the system 10 with data that defines vehicle schedule information.

Note that the data defining the checkpoints and/or other vehicle schedule information may be transmitted to the VCU 15 by the BSCU 40. This data may then be used to define the vehicle tracking information 39 (FIG. 3). Furthermore, the foregoing data and/or information based on the foregoing data may also be displayed to the driver of the vehicle 17 so that the driver is aware of the route that is to be driven.

The mapping application 150 may be configured to perform additional functionality for further simplifying the process of obtaining and managing the data used to monitor the vehicles associated with the system 10. In this regard, when a large number of items are to be delivered or picked up by a large number of vehicles 17 at various locations, it can be difficult to define routes for each of the vehicles 17 so that the items can be efficiently distributed among the vehicles 17. Therefore, conventional software programs, such as MapNet developed by Ecotran, have been developed that efficiently and automatically define routes for transporting items and that assign each of the items to a particular route. The routes are created based on locations of the vehicle stops. For example, in utilizing MapNet for a bus service, data identifying each passenger and the location where each passenger is to be delivered or picked-up is entered. Based on this information, the MapNet defines a route for each bus and assigns each passenger to the bus that is scheduled to stop at the delivery or pick-up point associated with the passenger. The MapNet is configured to efficiently define the routes such that the total number of buses and the delays associated with delivering or picking up the passengers are minimized.

In performing the above-described functionality, MapNet utilizes coordinate values, similar to the coordinate values produced by the sensor 18 in the preferred embodiment. In this regard, MapNet converts the input data identifying each bus stop location into coordinate values. Furthermore, to select and define the routes, MapNet includes coordinate values of the streets that may be used to transport the passengers. To select the optimal routes, MapNet defines different sets of routes for the buses, and determines how many buses would be required to transport the items and how far each bus must travel for each set of routes. The set of routes that provides optimal performance in terms of the number of buses required and the distance and/or delay associated with driving the routes is selected by MapNet. MapNet then outputs data indicating the selected routes. This data is usually in a form easily readable by a user. For example, instead of outputting the coordinate values of a route, MapNet outputs the street name or names that define the route and provides directions in terms of street names. For example, the output data may indicate that a bus, in driving the selected route for the bus, should turn onto Johnson Street, proceed to $5^{th}$ Avenue, turn left on $5^{th}$ Avenue, etc.

By modifying the MapNet software such that MapNet outputs coordinate values, MapNet may be used to implement the mapping application 150. In this regard, the mapping application 150 may be configured to receive, as input, data identifying each item to be transported and the location where the item is to be delivered or picked-up. Like MapNet, the mapping application 150 can then be configured to select an optimal set of routes for delivering and/or picking up the items based on the data received by the mapping application 150. The mapping application 150 then may output via display 65 or printer 66 data defining the routes and data indicating which items are assigned to which vehicle 17 or route. Furthermore, the mapping application 150 is preferably configured to store in database 43 the coordinate values defining the vehicle checkpoints used by the system 10 to monitor the vehicles 17. Therefore, once the data identifying each item to be transported and the location where the item is to be delivered or picked up is input into the system 10, the system 10 is configured to generate the necessary data for defining the routes that are to be used in delivering and/or picking up the items and for monitoring the vehicles 17 as the vehicles 17 travel the routes.

By utilizing the aforementioned techniques it is possible to efficiently obtain and maintain vehicle schedule information that can then be used to monitor the status of vehicle 17 and to transmit notification messages for notifying users of impending arrivals of the vehicles 17. It should be noted, however, that there are various methodologies for determining when notification events should occur, and the present invention should not be limited to the particular embodiment or embodiments disclosed herein. In this regard any method of scheduling notification events and for determining when notification events should occur may be implemented without departing from the principles of the present invention.

It should be noted that the present invention has been described herein as tracking vehicles 17 and determining when to generate a notification message to a user based on time values. However, other types of values may be used to monitor the travel of the vehicle 17. For example, a notification message could be generated when a particular vehicle comes within a certain distance of a particular location. U.S. Patent Application entitled, "Base Station Apparatus and Method for Monitoring Travel of a Mobile Vehicle," assigned Ser. No. 09/395,501, and filed on Sep. 14, 1999, which is incorporated herein be reference, describes how distance values may be used to determine when to transmit notification messages.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

Now, therefore, the following is claimed:

1. A vehicle tracking system, comprising:
   a mapping application module configured to receive data identifying a particular location from a user interface in one of a plurality of formats and to automatically translate said data identifying said particular location into a set of location values, in a format compatible with the location values produced by a location sensor said mapping application module further configured to store said set of location values; and
   a data manager configured to retrieve said set of location values stored by said mapping application module and to monitor travel of a vehicle based on a set of location values produced by said location sensor coupled to said vehicle, said data manager configured to determine, by comparing said set of location values produced by said location sensor to said set of location values retrieved by said data manager, when said vehicle is within a predefined proximity of said particular location, said data manager further configured to cause a notification message to be transmitted to a user communications device for notifying a user of an impending arrival of said vehicle at said particular location when said data manager determines that said vehicle is within said predefined proximity of said particular location.

2. The system of claim 1, wherein said data manager is remotely located from said vehicle.

3. The system of claim 1, wherein said mapping application module is configured to receive data identifying a plurality of locations, to define a plurality of routes based on said data identifying said plurality of locations, and to associate each of said plurality of locations with one of said routes.

4. The system of claim 1, wherein said mapping application module is configured to produce a map displaying symbols representing various locations including said particular location.

5. The system of claim 4, wherein said mapping application module is configured to transmit data defining said map across the Internet to a computer remotely located from said mapping application module, said mapping application module further configured to receive said data identifying said particular location from said computer.

6. The system of claim 5, wherein said computer is configured to enable a user to select said particular location based on said data defining said map.

7. The system of claim 1, wherein said data manager includes a database configured to store a route schedule of said vehicle.

8. The system of claim 7, wherein said database is further configured to store data indicating when different users are to be notified of an impending arrival of said vehicle.

9. The system of claim 8, wherein said data manager is further configured to query the database to build a list of notification events that are expected to occur during a specified time period, and wherein said data manager is further configured to scan the list to determine if a notification event should occur.

10. The system of claim 9, wherein said data manager is further configured to update said list upon determining that said vehicle is off schedule.

11. The system of claim 1, wherein said predefined proximity is based on time values.

12. The system of claim 1, wherein said predefined proximity is based on distance values.

13. The system of claim 1, wherein said data identifying a particular location is a street address.

14. The system of claim 1, wherein said location values are coordinate values.

15. The system of claim 1, wherein said location sensor is a GPS sensor.

16. A method for tracking vehicles, comprising the steps of:
   receiving data identifying a particular location from a user interface device in one of a plurality of formats;
   automatically translating said data received in said receiving step into a set of location values in a format compatible with the location values produced by a location sensor;

storing said set of location values;

monitoring travel of a vehicle based on a set of location values produced by said location sensor coupled to said vehicle;

comparing said set of said location values produced by said location sensor to said set of location values stored in said storing step;

determining when said vehicle is within a predefined proximity of said particular location based on said comparing step;

causing a notification message to be transmitted to a user communications device in response to a determination in said determining step that said vehicle is within said predefined proximity of said particular location; and notifying a user of an impending arrival of said vehicle at said particular location via said notification message.

17. The method of claim 16, further comprising the step of displaying, via said user interface, a map including symbols representing various locations, said particular location associated with a symbol displayed in said displaying step.

18. The method of claim 17, further comprising the step of transmitting data defining said map across the Internet to said user interface.

19. The method of claim 17, further comprising the steps of:

selecting said symbol associated with said particular location; and transmitting said data identifying said particular location in response to said selecting step.

20. The method of claim 19, further comprising the step of utilizing a mouse to perform said selecting step.

21. The method of claim 16, wherein said predefined proximity is based on time values.

22. The method of claim 16, wherein said predefined proximity is based on distance values.

23. The method of claim 16, wherein said data identifying a particular location is a street address.

24. The method of claim 16, wherein said location values are coordinate values.

25. The method of claim 16, wherein said location sensor is a GPS sensor.

26. A method for tracking vehicles, comprising the steps of:

receiving data identifying a plurality of locations from a user interface in one of a plurality of formats;

automatically defining a plurality of routes based on said data identifying a plurality of locations;

associating each of said plurality of locations with one of said routes;

automatically translating said data identifying said plurality of locations into location values in a format compatible with the location values producted by a location sensor;

storing a set of said location values, said set of location values identifying a particular location;

monitoring travel of a vehicle based on a set of location values produced by said location sensor coupled to said vehicle;

comparing said set of said location values produced by said location sensor to said set of location values stored in said storing step;

determining when said vehicle is within a predefined proximity of said particular location based on said comparing step;

causing a notification message to be transmitted to a user communications device in response to a determination in said determining step that said vehicle is within said predefined proximity of said particular location; and notifying a user of an impending arrival of said vehicle at said particular location via said notification message.

27. The method of claim 26, further comprising the steps of:

displaying a map including at least one symbol, said one symbol representing said particular location; and enabling a user to select said one symbol, wherein said data received in said receiving step includes data transmitted in response to a user selection of said one symbol.

28. The method of claim 26, wherein said predefined proximity is based on time values.

29. The method of claim 26, wherein said predefined proximity is based on distance values.

30. The method of claim 26, wherein said data identifying a plurality of locations is a plurality of street addresses.

31. The method of claim 26, wherein said location values are coordinate values.

32. The method of claim 2, wherein said location sensor is a GPS sensor.

* * * * *

UNITED STATES PATENT AND TRADEMARK OFFICE
CERTIFICATE OF CORRECTION

PATENT NO. : 6,618,668 B1
DATED : April 26, 2000
INVENTOR(S) : Laird et al.

It is certified that error appears in the above-identified patent and that said Letters Patent is hereby corrected as shown below:

<u>Title page,</u>
Item [75], Inventor, add -- Martin Kelly Jones, Delray Beach, FL (US) --

Signed and Sealed this

Eighth Day of March, 2005

JON W. DUDAS
*Director of the United States Patent and Trademark Office*